Oct. 12, 1971  D. N. TORRETTA  3,611,588
VISUAL-TACTUAL INTEGRATING DEVICE FOR TESTING AND TRAINING
Filed June 24, 1970  2 Sheets-Sheet 1

Daniel N. Torretta
INVENTOR.

Oct. 12, 1971 D. N. TORRETTA 3,611,588
VISUAL-TACTUAL INTEGRATING DEVICE FOR TESTING AND TRAINING
Filed June 24, 1970 2 Sheets-Sheet 2
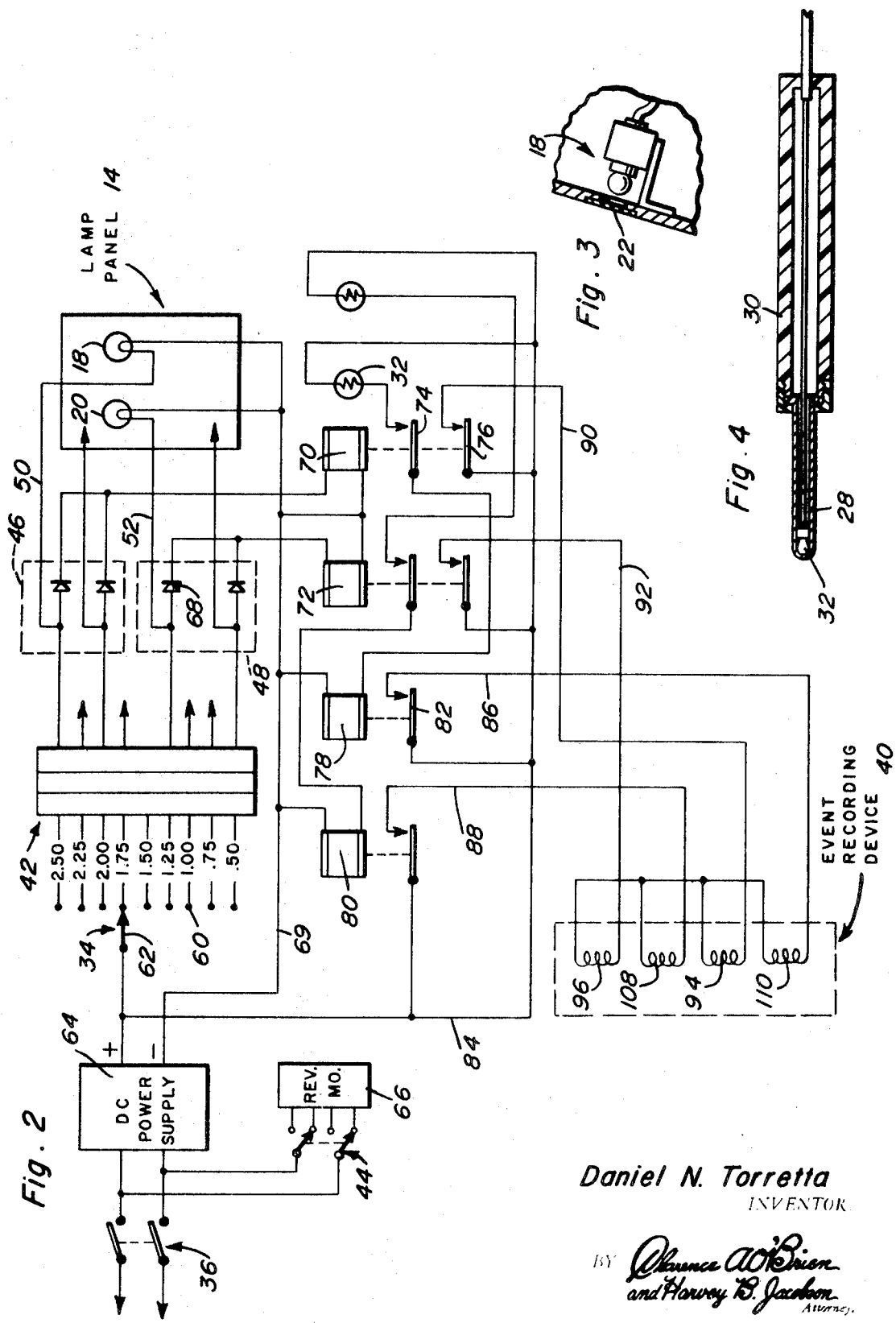
Daniel N. Torretta
INVENTOR
BY Clarence A. O'Brien
and Harvey B. Jackson
Attorney

United States Patent Office 3,611,588
Patented Oct. 12, 1971

3,611,588
VISUAL-TACTUAL INTEGRATING DEVICE FOR TESTING AND TRAINING
Daniel N. Torretta, Tampa, Fla., assignor to Vikintactin Research Consultants, Inc.
Continuation-in-part of application Ser. No. 884,791, Dec. 15, 1969. This application June 24, 1970, Ser. No. 49,489
Int. Cl. G09b 5/00
U.S. Cl. 35—9                                8 Claims

ABSTRACT OF THE DISCLOSURE

Panel-mounted lamps are sequentially illuminated in accordance with a preselected pattern to be followed by manipulation of photo-sensing pointers. An event registering device provides a record of light detection by the pointers and illumination of the lamps to enable analysis and scoring of a subject being trained or tested for motor response to visual stimuli.

This invention relates to apparatus for testing and training motor tactual responses of a subject to visual stimuli and is a continuation-in-part of my prior copending application U.S. Ser. No. 884,791, filed Dec. 15, 1969.

The present invention is concerned with the testing and training of personnel in the performance of a sequence of manipulative actions with accuracy and rapidity. This type of testing and training is particularly useful in mass production procedures, sub-assembly line production procedures, telephone switchboard operation procedures, key punch operation procedures, computer terminal operation procedures, etc. and wherever a sequence of manipulations must be performed with instruments in a rapid and accurate manner. It is therefore an important object of the present invention to provide an apparatus capable of being adjusted and programmed to progressively increase manipulative proficiency of a subject as well as to test a subject's proficiency. Further, the present invention is an improvement over the apparatus as disclosed in my prior copending application aforementioned in that the contact surfaces on the stimuli panel are eliminated and facilities are provided for more completely recording and analyzing the performance of the subject.

In accordance with the present invention, a visual stimuli panel is provided in the form of a plurality of red and green lamps which are sequentially illuminated for intervals of preselected duration in accordance with a predetermined pattern. Two probes or photo-sensitive pointers respectively corresponding to the red and green lamps are located at the base of the panel and are adapted to be manipulated by the subject in order to bring the probes into proximity with the light emitting windows respectively associated with the red and green lamps. The tip of each probe mounts a photo-sensitive cell which will be activated when placed within a fractional distance of the lamp window. Whenever an event is presented by illumination of either a red lamp or a green lamp, the subject responds by placing the probe tip in contact with the associated lamp window. The event will be registered or graphed by an event recorder. Both correct and incorrect motor responses may thereby be analyzed in order to evaluate the subject's response time and performance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an electrical circuit diagram illustrating one embodiment of the system underlying operation of the apparatus.

FIG. 3 is an enlarged partial sectional view as viewed from a plane indicated by section line 3—3 in FIG. 1, showing one of the panel-mounted lamp devices.

FIG. 4 is a longitudinal sectional view through one of the light sensitive probe devices associated with the apparatus.

Figure 1:
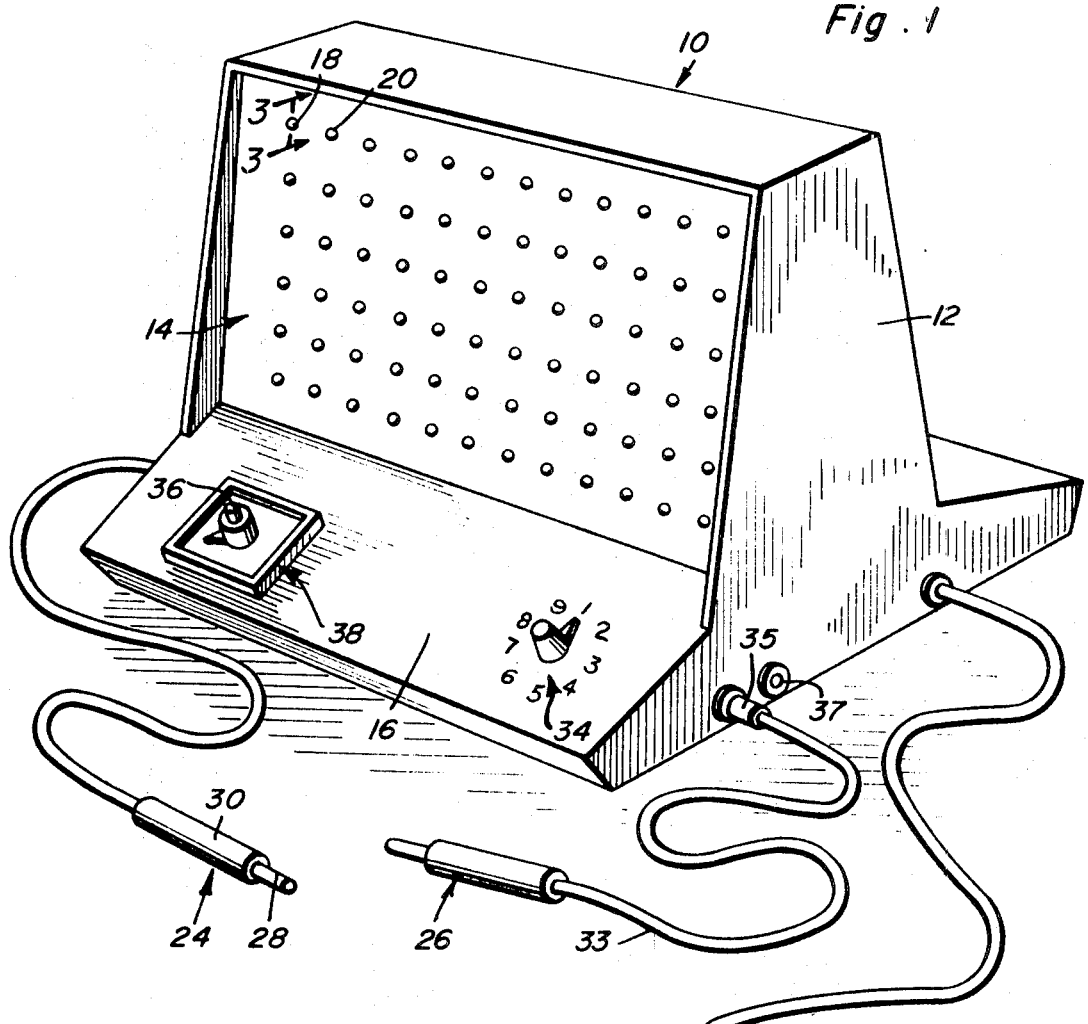
FIG. 1 is a perspective view of one form of apparatus constructed in accordance with the present invention.
Figure 1:
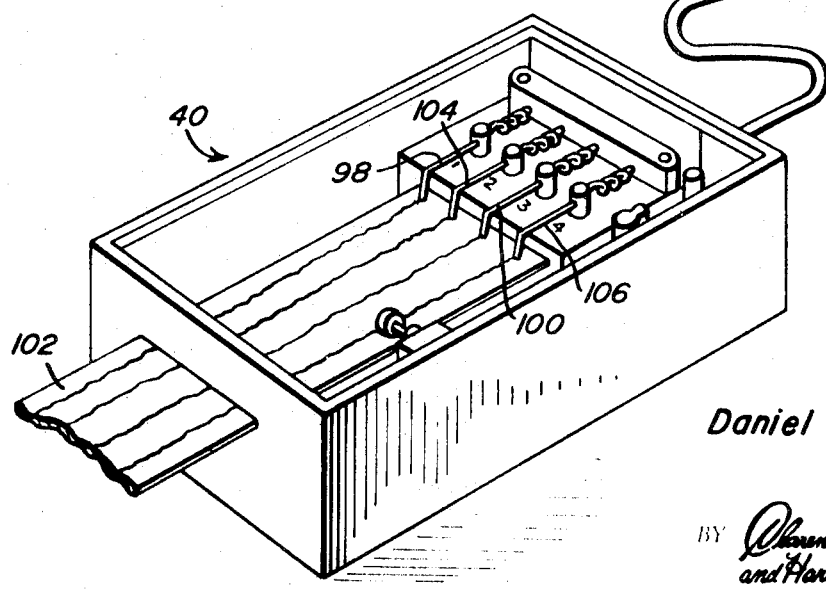

Referring now to the drawings in detail, FIG. 1 illustrates one embodiment of the invention in the form of apparatus 10 which includes a housing 12 having a visual stimuli panel assembly 14. The houing is also provided with a control panel portion 16. The stimuli panel assembly 14 mounts a plurality of visual stimulus devices in the form of two groups of visually distinguishable lamps such as the red lamps 18 and green lamps 20. The lamps are arranged in a plurality of columns and rows. The red and green lamps alternate in each column and row. Each lamp when energized emits light through a colored lens or transparent window cover 22 as more clearly seen in FIG. 3 mounted flush with the surface of the panel.

The light emitted from a lamp when energized will be transmitted through its associated window cover 22 to be engaged when illuminated by motor response means in the form of light sensitive probes or pointers 24 and 26. Each probe includes a tip 28 projecting from a non-conductive handle 30. The handles 30 of the probes are respectively colored red and green so as to correspond to the red and green lamps 18 and 20. Further, the tip 28 of each probe encloses a photo-sensitive cell 32 as shown in FIG. 4. The photo-sensitive cells are electrically connected to the control circuits within the housing 12 through electric cables 33 which extend from each of the probes to plug-in jacks 35 inserted into one of two jack receptacles or sockets 37 on each end of the housing adjacent the base.

The control panel portion 16 of the housing mounts a selector switch assembly 34 through which the duration of illumination intervals for the lamps may be selected. In the illustrated embodiment, the selector switch assembly is provided with nine positions each providing a different pattern and exposure time for the lamps. The intervals between energization or illumination of the lamps and the duration of illumination are equal. These intervals of time may accordingly be changed from a minimum of .5 second to a maximum of 2.5 seconds in steps of .25 second.

The control panel also mounts a timer 38 provided with a push button type of on-off switch 36. When the selector switch assembly 34 is set at a desired position, and the on-off switch 36 is actuated, operation of the apparatus ensues producing sequential illumination of the panel lamps 18 and 20 for a total program period of up to five minutes determined by the setting on the timer 38. The lamps are sequentially illuminated in accordance with a predetermined pattern of a repeating nature.

Also associated with the apparatus 10, is an event recorder generally referred to by reference numeral 40 in FIG. 1 by means of which the performance of the subject being tested or trained may be recorded and evaluated. To utilize the apparatus, the subject grasps the two probes 24 and 26 so as to manipulate them and engage the lamp lens covers on the panel assembly when illuminated. The subject is instructed to engage illuminated red lamps with the red colored probe 24 and illuminated green lamps with the green colored probe 26. Each time proper engagement is effected representing a correct motor response to the visual stimulus on the panel assembly, the recorder 40 graphs the event so that the performance of the subject may be evaluated. The motor response speed of the subject may be increased by correspondingly changing the setting of the selector switch assembly 34.

FIG. 2 illustrates the electrical circuit corresponding to the system of the invention. For the sake of clarity, only two lamps 18 and 20 are shown as part of the panel assembly 14, it being appreciated that the other red and green lamps are wired into the circuit in a similar manner. All of the red lamps associated with the panel assembly are electrically interconnected with the program control assembly 42 through a replaceable terminal board 46 while the green lamps are interconnected with the program control assembly through a separate replaceable terminal board 48. The terminal board 46 establishes an electrical connection 50 to each of the red lamps while the terminal board 48 establishes an electrical connection 52 for each of the green lamps. The program control assembly 42 transfers voltage to one of the electrical connections 50 or 52 in order to energize one of the lamps 18 or 20. Voltage is supplied to the program control assembly through one of the plurality of contacts 60 associated with the selector switch assembly 34. The angularly displaceable switch contact arm 62 of the selector switch assembly is therefore connected to the positive output of a D.C. power converter component 64. An A.C. input voltage is supplied to the power converter 64 through the timer controlled on-off switch 36. Upon closing of the on-off switch 36, A.C. voltage is also supplied to a reversible drive motor 66 through a reversing switch 44. The drive motor 66 is drivingly connected to the program control assembly 42 which is constructed and operates in a manner disclosed in my prior copending application aforementioned.

The panel mounted lamps 18 and 20 are connected by the negative voltage line 69 to the negative terminal of the D.C. power supply 64 in order to complete an energizing circuit for a selected lamp when positive voltage is applied thereto through one of the connections 50 and 52 aforementioned. The D.C. voltage applied to each of the lamps 18 and 20 through the lines 50 and 52 is also applied through one of the diodes 68 mounted by the terminal boards 46 and 48 to the relay coils 70 and 72 respectively corresponding to the red and green lamps. Accordingly, when voltage is supplied to one of the lines 50 and 52, the associated relay coil 70 or 72 is energized to close a normally opened relay switch 74 or 76 associated with each of the relay coils. Upon closing of the relay switches 74, a photo-sensitive cell 32 associated with each of the probes is connected to the terminal associated with one of a second pair of relay coils 78 and 80. The other terminals of relay coils 78 and 80 are connected to tse negative voltage line 69. Therefore, only after an associated red or green lamp is energized together with one of the relay coils 70 and 72, will the associated photocell 32 be connected in circuit to one of the relay coils 78 and 80. When light is detected by the photo-cell it will therefore supply a voltage signal to its associated relay coil 78 or 80 causing it to be momentarily energized. Each relay coil 78 and 80 has a normally opened relay switch 82 connected to the positive voltage line 84 that extends from the positive terminal of the D.C. power supply 64. As long as a probe relay coil 78 or 80 is energized, its associated relay switch 82 will close to supply signal voltage to output line 86 or 88.

The probe output lines 86 and 88 supply signal voltages to the event recording device 40 when an associated photocell 32 detects light from an associated one of the two groups of red and green lamps. When a red or green lamp is illuminated, signal voltage is also supplied to the event recording device through the output lines 90 and 92 upon closing of the relay switches 76 by energization of the associated relay coil 70 or 72. When a red lamp, for example, is energized, the relay coil 70 is energized to supply signal voltage through line 90 to a stylus actuating coil 94 in the event recording device 40. On the other hand, when a green lamp is energized, the relay coil 72 closes its relay switch 76 to supply signal voltage through line 92 to another stylus actuating coil 96 in the event recording device. The coils 94 and 96 will accordingly actuate styli 98 and 100 in the recording device as illustrated in FIG. 1 to produce deflection of graph lines on a continuously moving tape 102 being driven at a constant speed such as 12 inches per minute. A second pair of styli 104 and 106 are deflected by energization of actuating coils 108 and 110. The coils 108 and 110 are energized when supplied with signal voltage through the output lines 86 and 88 in response to detection of light by the photo-sensitive cells 32. Thus, the recording device 40 will graph the intervals during which the red and green lamps are illuminated and at the same time the intervals during which a proper corresponding probe 24 or 26 is detecting light therefrom. Thus, the lapsed time involved between presentation of the event and the actual motor response can be measured by determining the distance between the deflection point on the graph of the event and the response, given a predetermined constant rate of speed of the graph tape 102. The length of time of all events and responses and the delayed reactions may thereby be objectively determined.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for testing and/or training a subject with respect to motor response to stimuli comprising a panel assembly having a plurality of light emitting devices, programmed means connected to the panel assembly for sequential operation of said devices during intervals of preselected duration, light sensitive probe means connected to the programmed means and adapted to be positioned in proximity to selected ones of the devices under control of the subject, and means responsive to said positioning of the probe means in proximity to the selected devices during associated intervals of operation for indicating correct manipulation of the probe means by the subject.

2. The combination of claim 1 wherein said light emitting devices comprise at least two groups of visually distinguishable lamps and said probe means comprise at least two photo-sensitive pointers corresponding respectively to said two groups of lamps.

3. The combination of claim 2 wherein said programmed means includes a source of voltage, two circuit sections connected to said source for energizing selected lamps of the respective groups in sequence, and timing means connected to said circuit sections for controlling the duration of and spacing between said intervals of operation.

4. The combination of claim 3 wherein said indicating means includes recording means for registering energization of said two circuit sections, and means for registering detection of light by the photo-sensitive pointers.

5. The combination of claim 4 wherein said energization of the lamps and detection of lights are registered on a common recording medium for comparison purposes.

6. The combination of claim 2 wherein said indicating means includes recording means for registering energization of said devices, and means for registering detection of light by the photo-sensitive pointers.

7. The combination of claim 6 wherein said energization of the devices and detection of light are registered on a common recording medium for comparison purposes.

8. The combination of claim 1 wherein said programmed means includes a source of voltage, two circuit sections connected to said source for energizing selected devices in sequence, and timing means connected to said circuit sections for controlling the duration of and spacing between said intervals of operation.

References Cited
UNITED STATES PATENTS

| | | | |
|---|---|---|---|
| 3,100,352 | 8/1963 | Boissevain | 35—9 R |
| 3,277,588 | 10/1966 | Lynott et al. | 35—9 R |
| 3,526,971 | 9/1970 | Shipley | 35—9 R |

WILLIAM H. GRIEB, Primary Examiner